United States Patent Office 3,295,658
Patented Jan. 3, 1967

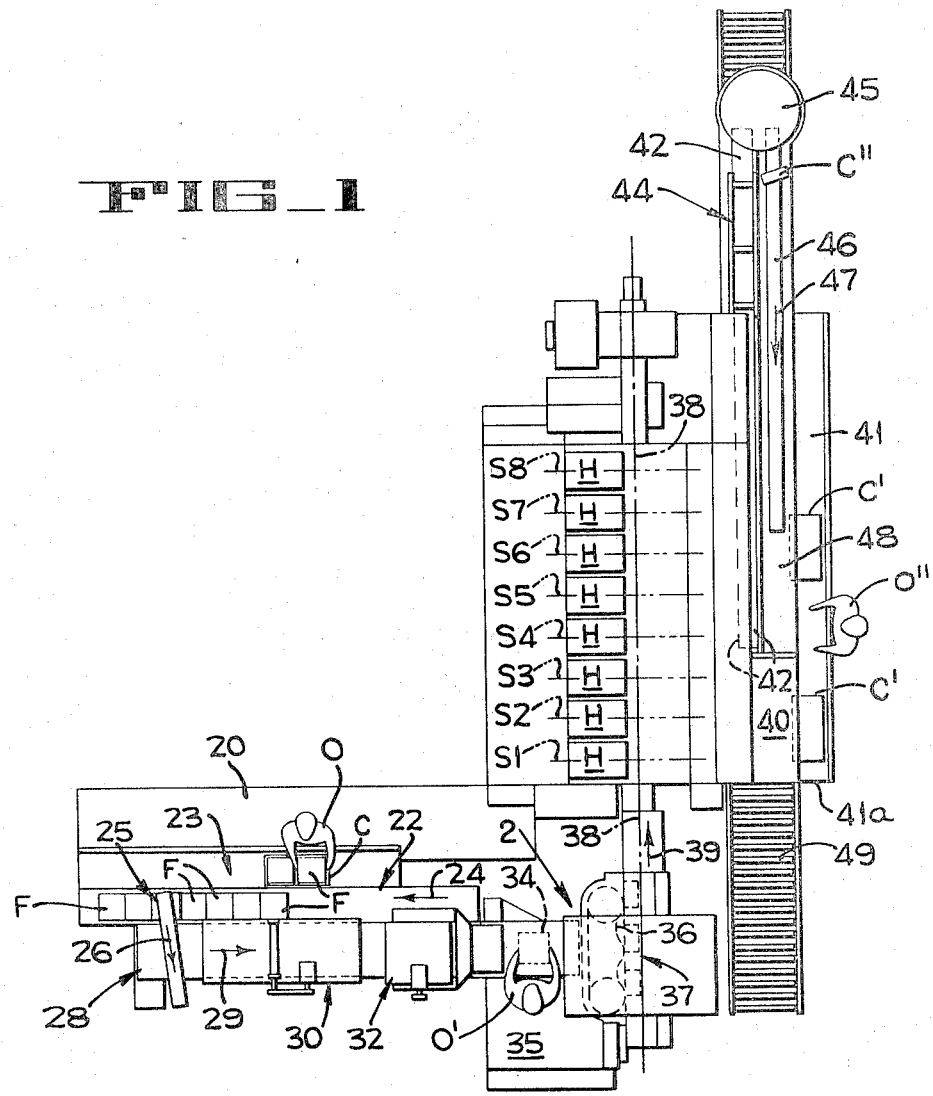

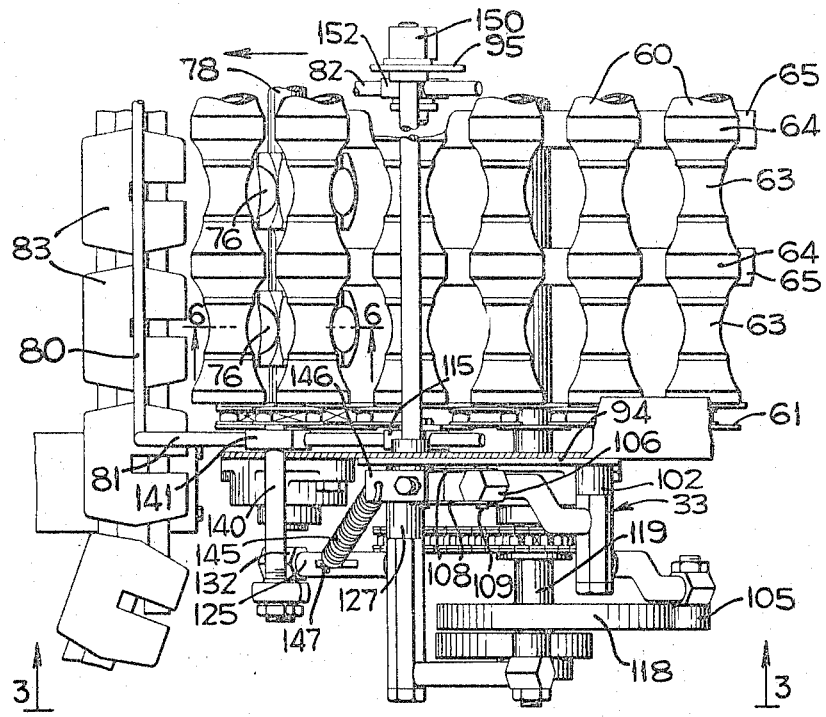
FIG_2
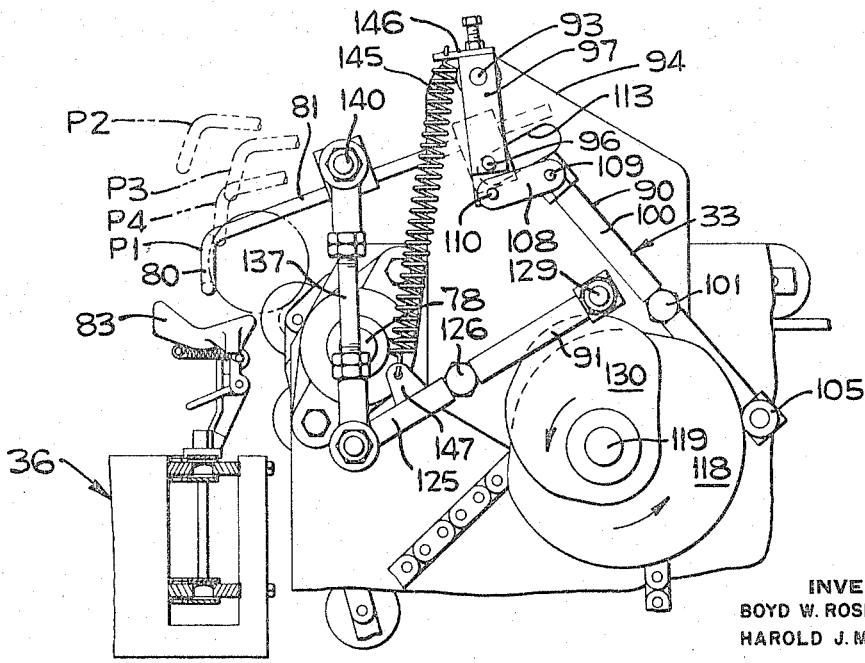
FIG_3
INVENTORS
BOYD W. ROSE
HAROLD J. MUMMA
BY Hans G. Hoffmeister
ATTORNEY

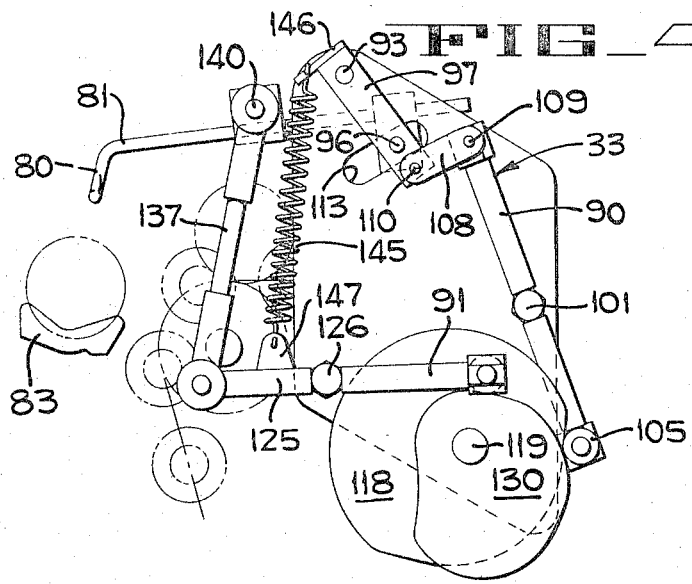
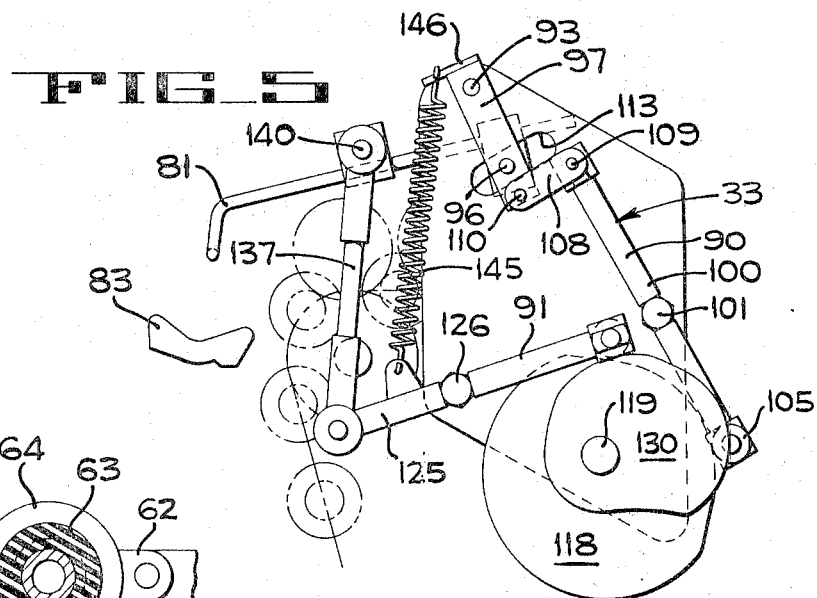
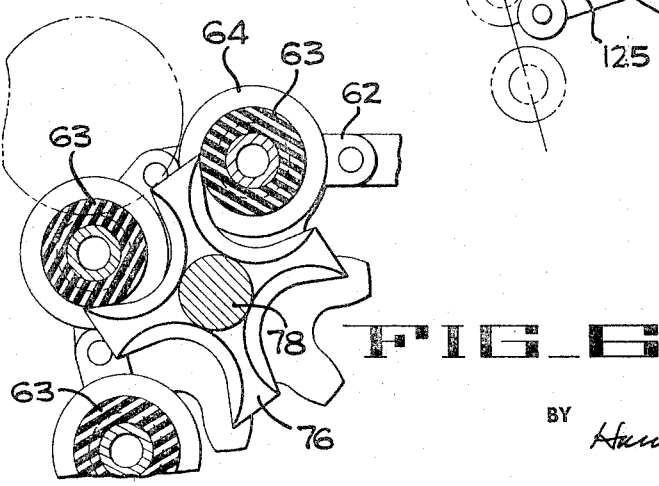

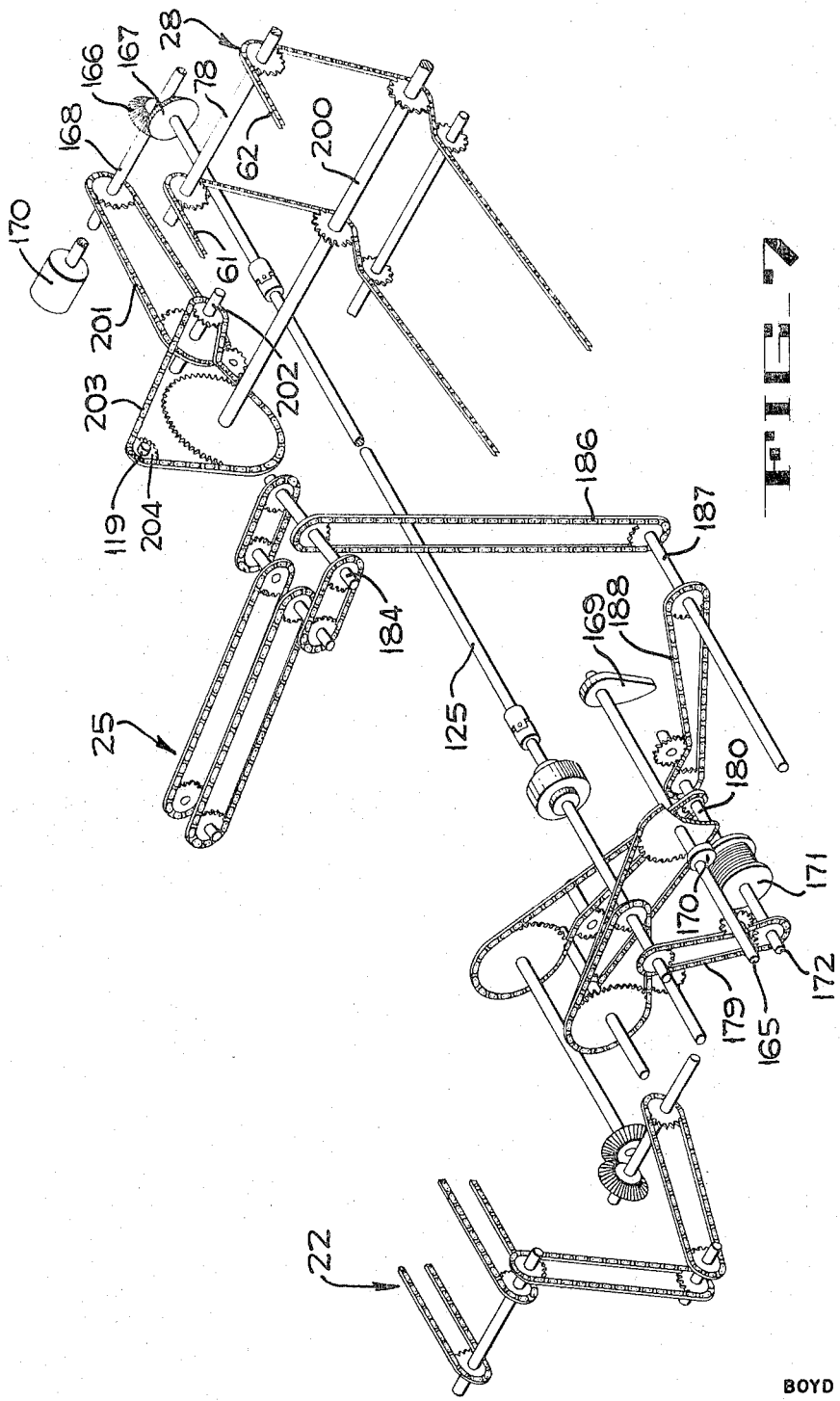

3,295,658
TRANSFER CONTROL MECHANISM FOR
EGG PROCESSING MACHINES
Boyd W. Rose and Harold J. Mumma, Riverside, Calif.,
assignors to FMC Corporation, San Jose, Calif., a corporation of Delaware
Original application Sept. 28, 1962, Ser. No. 226,994, now
Patent No. 3,252,607, dated May 24, 1966. Divided
and this application Oct. 13, 1965, Ser. No. 495,429
2 Claims. (Cl. 198—30)

This application is a division of application Serial No. 226,994 which was filed on September 28, 1962, now Patent No. 3,252,607.

This invention relates to conveyors and more particularly relates to a mechanism for controlling the discharge of articles, such as eggs, from a conveyor.

It is an object of the present invention to provide an improved conveyor system for handling articles such as eggs.

Another object is to provide a mechanism for controlling the discharge of eggs from a conveyor.

Other and further objects and advantages of the present invention will be apparent from the following description taken in connection with the accompanying drawings, in which:

FIGURE 1 is a diagrammatic plan of an egg processing machine embodying the conveyor system of the present invention.

FIGURE 2 is an enlarged fragmentary plan of the discharge end of the roller conveyor of the present invention, the view being taken in the area indicated by the arrow 2 in FIGURE 1, and so oriented that the conveyor is shown as moving from right to left rather than from left to right as in FIGURE 1.

FIGURE 3 is a diagrammatic side elevation, with parts in section, taken as indicated by lines 3—3 of FIGURE 2.

FIGURES 4 and 5 are diagrammatic side elevations similar to FIGURE 3 but showing different operating positions of the egg discharge mechanism.

FIGURE 6 is an enlarged vertical section taken on lines 6—6 of FIGURE 2.

FIGURE 7 is a schematic showing of the drive train of the machine of the present invention.

The egg processing machine, which is shown in the above-mentioned parent application that is incorporated by reference herein, is of the type adapted to receive eggs on filler flats which are manually removed from field cases received from the egg producer. During their movement through the machine the eggs are removed from the filler flats, washed, dried, candled, weighed and graded and placed in cartons. In the diagrammatic showing of FIGURE 1, the reference numeral 20 indicates a platform on which an operator O stands as he removes a filler flat F from a field case C resting on a roller conveyor 23 and places the flat on an endless belt conveyor 22, the upper run of which moves intermittently in the direction of arrow 24 to position the loaded flats one by one, under one end of a transfer unit 25. The transfer unit 25 lifts the thirty eggs from the filler flat and moves them in the direction of arrow 26 to a position above an endless roller processing conveyor 28, the upper run of which moves in the direction of arrow 29. The transfer unit deposits the eggs on the conveyor 28 which carries them through a washer 30, a drier 32, and over a candling light 34 where they are inspected by a second operator O′ standing on a platform 35. After sub-standard eggs are removed by the operator, the remaining eggs are discharged, under control of a mechanism featured in the present invention, into individual cups of an endless chain transfer conveyor 36 which delivers the eggs into a weighing unit 37 comprising three scales, each of which is adapted to receive and weigh different eggs and deposit them on an endless chain bucket conveyor, indicated by a centerline 38. The upper run of conveyor 38 moves in the direction of arrow 39 and carries the eggs in single file past eight cartoning stations which are indicated by phantom lines S1–S8. At each station, a carton or filler flat is automatically removed from a supply hopper H, moved to the right (FIG. 1) and positioned under the upper run of the bucket conveyor 38 so that an egg, having the particular grade assigned to that station, can be discharged into the carton or flat. In FIGURE 1, an arrangement is illustrated wherein stations S1–S3 are arranged to pack filler flats, and stations S4–S8 are arranged to handle cartons of the usual type adapted to receive a dozen eggs and store them in two rows with six eggs in each row. When the flats have been filled at stations S1–S3, they are moved by appropriate conveying means onto a flat apron 40 where they are within easy reach of an operator O″ who places the filled flats in shipping cases C′ positioned on a flat platform 41. When a carton has been filled at any of the stations S4–S8, it is automatically moved onto an endless belt conveyor 42 which carries the carton through a closing unit 44 and moves it onto a rotating disc 45. The disc reverses the direction of movement of the carton, rotates it 90°, and deposits it on a second endless belt conveyor 46, in a position generally transverse to the belt, as indicated by carton C″, for conveyance in the direction of arrow 47 to a second apron 48 within reach of operator O″. When a shipping case C′ has been filled, the operator slides the case to the end 41A of platform 41 and shifts it to a take-away conveyor 49.

The endless roller conveyor 28 comprises a plurality of rollers 60 (FIG. 2) that extends transversely between and are rotatably mounted on pins projecting from two spaced endless chains 61 and 62 (FIGS. 2 and 6). Each roller has a plurality of sections 63 of hourglass configuration with cylindrical portions 64 of the roller in the upper run of the conveyor resting on fixed roller support tracks 65. Thus, as the chains are driven by a powered sprocket mechanism, which will be described presently, the rollers in the upper run of the conveyor are moved from right to left (FIG. 2) and are rotated due to the contact of the cylindrical portions 64 with the fixed tracks 65. It will be noted that each hourglass section 63 of the rollers cooperates with similar sections of adjacent rollers to provide pockets, each of which is adapted to receive and support an egg.

When the eggs reach the discharge end of the roller conveyor, they are discharged therefrom under control of a cam-actuated release mechanism 33 (FIGS. 2–5). As seen in FIGURES 2 and 6, a plurality of four-armed star wheels 76 are secured to an idler shaft 78 on which idler sprockets of the conveyor 28 are mounted, one star wheel being in alignment with each longitudinal row of pockets on the roller conveyor 28. The star wheels are so arranged on the shaft 78 that each arm of the wheels moves up into a pocket to lift the egg out of the pocket. As the eggs drop out of the pocket, their fall is arrested by a bar 80 (FIGS. 2 and 3) which extends across the discharge end of the conveyor and has a pair of rearwardly extending arms 81 and 82. In FIGURE 3, four typical positions of the bar 80 are indicated. P1 indicates approximately the position the bar assumed just before eggs are discharged from the conveyor. It remains in this position until an egg from each of the six pockets has been deposited therein. Then it swings slightly forwardly and upwardly to position P2, releasing the eggs so that they drop simultaneously into six cups 83 of the transfer conveyor 36 which delivers the eggs to the weighing unit 37. The bar 80 then moves rearwardly to position P3, then downwardly to position P4, and finally returns to position P1 to receive the next group of six eggs. While the above-described path of movement of bar 80 is effective in releasing the six eggs simultaneously, other paths may be used, it being necessary only that the bar moves forwardly and then upwardly rather abruptly to clear the eggs.

Since the eggs on roller conveyor 28 are of different sizes, it is possible that, in any group of six eggs that reach the end of the conveyor abreast, some will be large and some will be small. Accordingly, when the star wheels engage the eggs and lift them out of their pockets, the large and jumbo eggs will tend to roll off the conveyor first and drop toward the cups of the transfer conveyor 36. Since the cups of the transfer conveyor are in stationary position below the bar 80 for only a very short time, it is desirable that all of the six eggs be discharged simultaneously at a predetermined time. The release mechanism of the present invention causes the bar 80 to remain in position until all six eggs have been discharged from conveyor 28. Then the bar is quickly lifted, and the eggs drop as a unit onto the cups of the transfer conveyor.

The orbital movement of the bar 80 is effected by two linkages 90 and 91 (FIG. 3) which are both mounted on the same side of the roller conveyor 28 at its discharge end. In general, linkage 90 causes the bar 80 to swing back and forth in a generally horizontal direction about the axis of a transverse shaft 93 journalled between two identical upstanding fixed support plates 94 and 95 on opposite sides of the conveyor, while linkage 91 swings the bar 80 up and down about the axis of a short shaft 96 that is mounted in the lower end of a control lever 97 in a manner to be described presently.

The linkage 90 includes a lever 100 (FIGS. 2 and 3) which is pivoted on a bolt 101 that is threaded into a block 102 (FIG. 2) secured to the support plate 94. At one end, the lever 100 carries a roller follower 105 and, at the other end, it is provided with a hexagonal head 106 to which two flat bars 108 are pivotally connected by pin 109. The bars 108 are also pivoted by pin 110 to the lower end of the control lever 97 which is secured to the transverse shaft 93. The short shaft 96 is secured in the lever 97 and projects laterally therefrom through an opening 113 in the support plate 94. On the opposite side of plate 94, the shaft 96 is pivotally secured in a block 115 that is fixed on the arm 81 of bar 80. The roller follower 105 on lever 100 rides along the surface of a cam 118 that is keyed to a shaft 119 which is journalled in the side plates of the conveyor 28. The cam rotates counterclockwise (FIG. 3) causing the lever 100 to oscillate about bolt 101 whereby the control lever 97 is oscillated about the axis of shaft 93.

The second linkage 91 comprises a lever 125 which is pivoted on a bolt 126 that is threaded into a block 127 secured to the support plate 94. At one end, the lever 125 carries a roller follower 129 which rides on the peripheral surface of a cam 130 and, at the other end, the lever is provided with a hexagonal head 132. The head 132 is pivoted to the lower end of a rigid link 137, the upper end of which is pivoted to a horizontal rod 140 (FIG. 2) that is disposed in a block 141 keyed to the arm 81 of bar 80. As the cam 130 is rotated counterclockwise, the lever 125 is oscillated about bolt 126, causing the arm 81 to swing up and down about the axis of the shaft 96. A spring 145 is stretched between a tab 146 on control lever 97 and a tab 147 on lever 125, the spring being arranged to pivot said levers in a direction to hold the cam roller followers 105 and 129 on their associated camming surfaces.

The two above-described cam actuated linkages 90 and 91, which coact to move the bar 80 through its orbital path are, as mentioned above, mounted on the support plate 94 at one side of the conveyor 28. These parts are not duplicated on the opposite side, it being necessary only to provide a control lever 150 (FIG. 2) which is substantially identical to control lever 97, being secured to the transverse shaft 93, so that it will pivot simultaneously with control lever 97, and having a short shaft (not shown) similar to shaft 96 and extending through a slot in support plate 95 to pivotally receive a block 152 that is keyed to the arm 81 of bar 80. With this arrangement, the control lever 150 will provide support for one end of bar 80 and will permit it to follow the movements dictated by the cam-actuated linkages 90 and 91.

The drive train for the several above-described mechanisms is shown diagrammatically in FIGURE 7. As explained, in the parent application, Serial No. 226,994, now Patent No. 3,252,607, the filler flat conveyor 22 and the vacuum cup carriage of the transfer unit 25 are driven intermittently while the roller conveyor 28 is driven continuously. Also, the drive arrangement is that the vacuum cup carriage is held stationary at its home position above a flat of eggs disposed on the filler flat conveyor 22, which is also stationary and, while these members are stationary, the conveyor 22 is pivoted upwardly to raise the eggs into engagement with the vacuum cups on the carriage. When the eggs have been gripped, the conveyor 22 is lowered, and then the vacuum carriage and the conveyor 22 are actuated, the carriage being effective to move the eggs to a position above the moving roller conveyor 28, discharge them, and return to its home position, and the filler flat conveyor being effective to move the empty flat away from the pickup position under the vacuum carriage and move a filled flat of eggs to said pickup position.

The drive train comprises a main shaft 125 (FIG. 7) which is driven through bevel gears 166 and 167 by a drive shaft 168. A main drive motor 170, which is operatively connected in driving engagement with said shaft 168, may, if desired, be connected to other mechanisms such as the transfer conveyor 36 and the bucket conveyor 38. The main shaft 125 drives a camshaft 165 that carries a cam 169 which controls the raising and lowering of the filler flat conveyor 22, and a cam 170 which controls the engagement and disengagement of a clutch 171. The clutch has an input shaft 172, which is continuously driven by the main shaft 125 through a sprocket and chain drive 179, and an output shaft 180 which is intermittently connected to the continuously rotating input shaft to drive the filler flat conveyor 22 and the vacuum carriage.

The drive shaft 184 (FIG. 7) of the vacuum carriage is driven from the clutch output shaft 180 by a chain 186, a shaft 187, and a sprocket and chain drive mechanism 188 connecting shaft 187 to the clutch output shaft 180.

The roller conveyor 28 has a drive shaft 200 (FIG. 7) that is driven from the drive shaft 168 through a sprocket and chain unit 201 connected between shaft 168 and an idler shaft 202, and a sprocket and chain unit 203 connected between the shaft 202 and the drive shaft 200 of the roller conveyor 28.

The chain of unit 203 is also trained around a sprocket 204 which is keyed to the camshaft 119 (FIG. 3) that controls the movement of the cam-actuated egg discharge mechanism 33.

Accordingly, since the egg discharge mechanism 33 and the roller conveyor 28 are driven from the same shaft 168, these mechanisms are moved in synchronism to efficiently discharge the eggs from the roller conveyor.

Having thus described our invention, what we claim as new and desire to protect by Letters Patent is:

1. In an egg processing machine, a conveyor comprising an endless roller conveying chain, means defining a plurality of pockets between said rollers, guide means for changing the direction of movement of said roller chain to define the discharge end of the conveyor, drive means for driving said endless roller chain to move eggs in said pockets to the discharge end of the conveyor and discharge the eggs over the end, a mechanism for retarding the fall of eggs from said roller chain including an egg-arresting bar adapted to be disposed in an egg-intercepting position adjacent the discharge end of said conveyor and slightly below the level of the upper run of said endless chain to intercept eggs dropping over said discharge end, a first linkage connected to said bar for swinging said bar in a generally horizontal direction about a horizontal axis, a second linkage connected to said bar for swinging said bar in a generally vertical direction about a horizontal axis, a shaft driven in timed relation with said drive means, and cams keyed to said shaft and operatively connected to said two linkages to control the movement thereof and effect movement of said egg-arresting bar from said egg-intercepting position in an orbital path away from said position to release eggs and then back to said position.

2. In an egg processing machine, a conveyor comprising an endless roller conveying chain, means defining a plurality of pockets between adjacent rollers, guide means for changing the direction of movement of said roller chain to define the discharge end of the conveyor, drive means for driving said endless roller chain to move eggs in said pockets to the discharge end of the conveyor and discharge the eggs over the end, a mechanism for retarding the fall of eggs from said roller chain including an egg-arresting bar extending transversely of said conveyor adjacent the discharge end thereof in the path of eggs dropping therefrom, a first linkage mounting said bar for swinging movement in a generally horizontal direction about a horizontal axis, a second linkage connected to said bar for swinging said bar in a generally vertical direction about a horizontal axis, and means for actuating said linkages in timed relation with said drive means.

References Cited by the Examiner
UNITED STATES PATENTS

| | | | |
|---|---|---|---|
| 2,919,787 | 1/1960 | Peck et al. | 198—30 |
| 2,961,087 | 11/1960 | Reading | 198—33 |
| 3,179,230 | 4/1965 | Brown | 198—30 |

SAMUEL F. COLEMAN, *Primary Examiner.*

EVON C. BLUNK, *Examiner.*

R. E. KRISHER, A. C. HODGSON, *Assistant Examiners.*